United States Patent
Secanu

(10) Patent No.: US 6,533,424 B2
(45) Date of Patent: Mar. 18, 2003

(54) EXTERIOR REARVIEW MIRROR FOR VEHICLES, IN PARTICULAR, MOTOR VEHICLES

(75) Inventor: Florin Secanu, Nürtingen (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/915,808

(22) Filed: Jul. 26, 2001

(65) Prior Publication Data

US 2002/0024750 A1 Feb. 28, 2002

(30) Foreign Application Priority Data

Jul. 27, 2000 (DE) .......................... 100 36 592

(51) Int. Cl.$^7$ .......................... G02B 5/08; G02B 7/182; B60R 1/06
(52) U.S. Cl. .......................... 359/841; 359/872; 359/877
(58) Field of Search .......................... 359/841, 871, 359/872, 877

(56) References Cited

U.S. PATENT DOCUMENTS

| 4,815,837 A | * | 3/1989 | Kikuchi et al. | |
| 4,877,319 A | * | 10/1989 | Mittelhauser | |
| 4,973,147 A | * | 11/1990 | Fujita et al. | |
| 5,455,716 A | * | 10/1995 | Suman et al. | 359/872 |
| 5,889,624 A | * | 3/1999 | Dickenson | 359/841 |
| 5,896,238 A | * | 4/1999 | Hubscher et al. | 359/877 |
| 6,011,518 A | * | 1/2000 | Yamagishi et al. | |
| 6,244,714 B1 | * | 6/2001 | Mertens | 359/872 |
| 6,312,135 B1 | * | 11/2001 | Polzer | 359/871 |

* cited by examiner

Primary Examiner—Ricky D. Shafer
(74) Attorney, Agent, or Firm—Gudrun E. Huckett

(57) ABSTRACT

An exterior rearview mirror for motor vehicles has a mirror base and a mirror head connected foldably to the mirror base. An electrical line extends through the mirror base to an electrical consumer arranged in the mirror head. The electrical line has a first line section arranged in the mirror base and a second line section arranged in the mirror head. A first plug part is connected to the first line section and a second plug part is connected to the second line section. The first and second plug parts detachably connect the first line section and the second line section to one another. The first and second plug parts become detached from one another when the mirror head is folded from the position of use into a folded position and are reconnected automatically when the mirror head is moved back into the position of use.

18 Claims, 4 Drawing Sheets

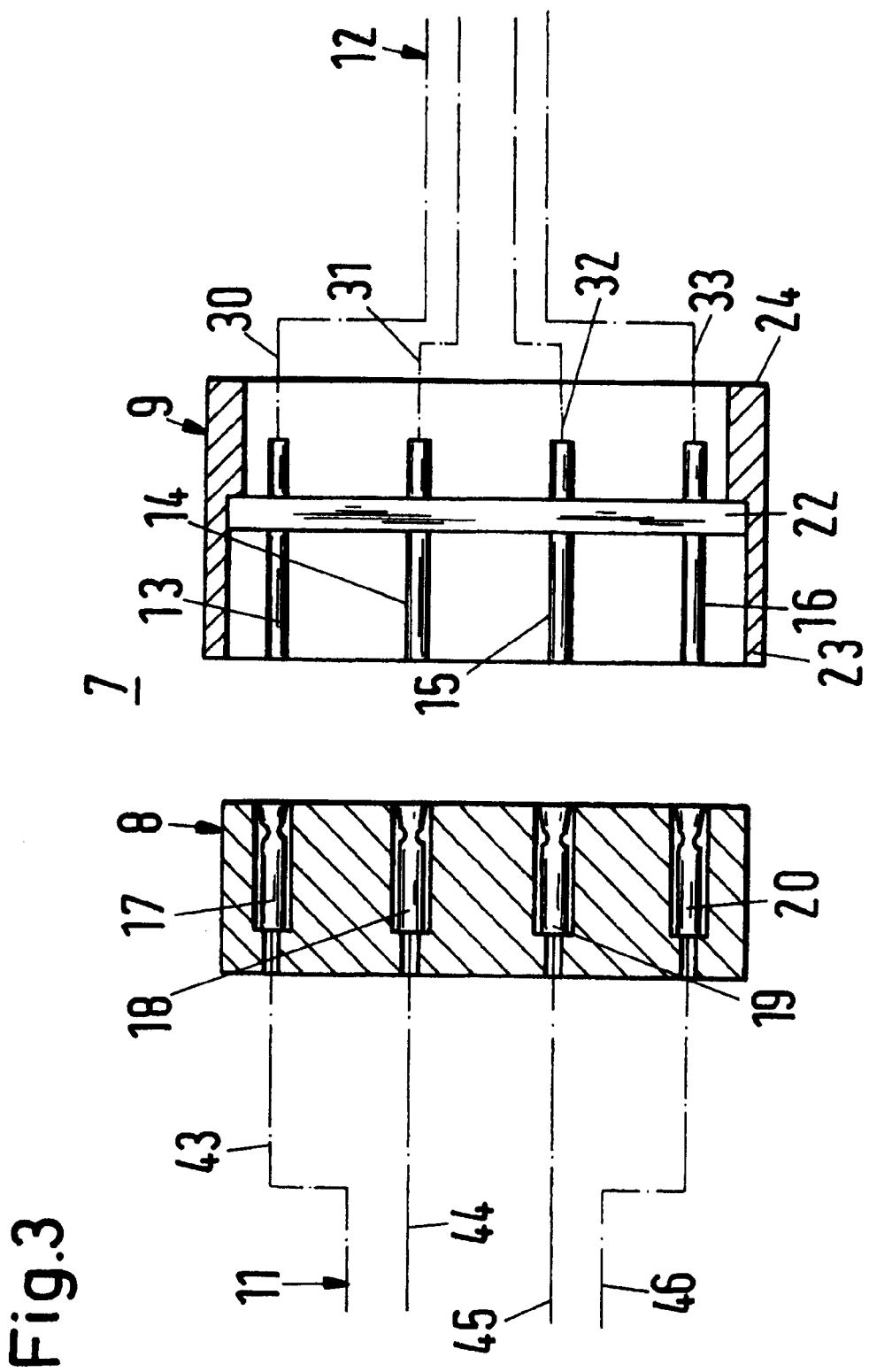

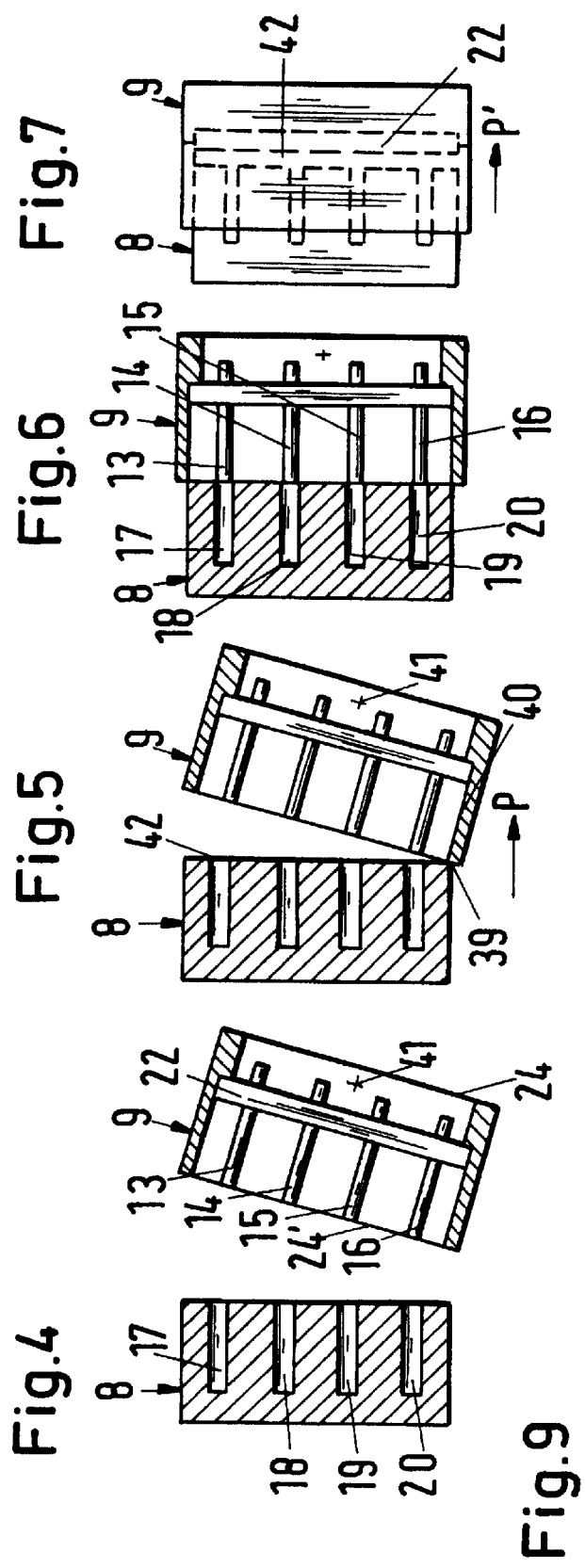

EXTERIOR REARVIEW MIRROR FOR VEHICLES, IN PARTICULAR, MOTOR VEHICLES

BACKGROUND OF THE INVENTION

1. Field of the Invention

The invention relates to an exterior rearview for vehicles, in particular, motor vehicles, comprising a mirror base to be fastened to the vehicle and a mirror head with mirror glass which is connected to the mirror base so as to be foldable in at least one direction relative to the mirror base, and further comprising at least one electrical line which is guided through the mirror base to at least one electrical consumer in the mirror head.

2. Description of the Related Art

In exterior rearview mirrors of the aforementioned kind, the mirror head can be pivoted from the position of use into a folded (parking) position to the rear when viewed in the travel direction of the motor vehicle. The mirror head, however, can also be pivoted relative to the mirror base upon impact to the front in the travel direction. A disadvantage in this connection is that such a folding movement must also be carried out by the electrical lines extending to the electrical consumers in the mirror head, for example, a heating device for the mirror glass or an electrical drive for adjusting the mirror glass.

SUMMARY OF THE INVENTION

It is an object of the present invention to configure an exterior rearview mirror of the aforementioned kind such that, when pivoting the mirror head relative to the mirror base, the electrical lines in the exterior rearview mirror will not impair the folding movement.

In accordance with the present invention, this is achieved in that the line is comprised of at least one line section arranged within the mirror base and at least one line section arranged within the mirror head, wherein the line sections are connected to one another by plug parts which, when folding the mirror head, become detached from one another and, when pivoting the mirror head back, automatically are reinserted into one another.

As a result of the detachable connection of the plug parts provided between the line sections, between the mirror head and the mirror base there are no lines which could impair the pivot movement when folding or pivoting the mirror head relative to the mirror base. The plug parts become detached from one another when folding or pivoting the mirror head and, when pivoting the mirror head back into the position of use, are automatically reinserted into one another. In this way it is possible to reestablish in a constructively simple way the required line connection.

BRIEF DESCRIPTION OF THE DRAWING

In the drawing:

FIG. 3 shows on an enlarged scale in a schematic illustration the plug connector of the electrical line arranged between the mirror head and the mirror base and comprised of two plug parts;

FIG. 4 is a detail view of the two plug parts of the plug connector of FIG. 3 in the detached position;

FIG. 5 is a detail view of the plug parts of the plug connector of FIG. 3 in a position where the plug parts contact one another upon pivoting the mirror head back from the folded position into the position of use;

FIG. 6 is a detail view of the plug parts of the plug connector of FIG. 3 in a position in which they are aligned with one another shortly before insertion into one another;

FIG. 7 is a detail view of the plug parts of the plug connector of FIG. 3 in a position in which the plug parts are again inserted into one another;

FIG. 8 is a detail view of the plug parts of the plug connector of FIG. 3 in a pivot end position of the pivotable plug part;

FIG. 9 is a schematic illustration of a contact pin and a contact tongue according to FIG. 6.

DESCRIPTION OF THE PREFERRED EMBODIMENTS

Figure 1:
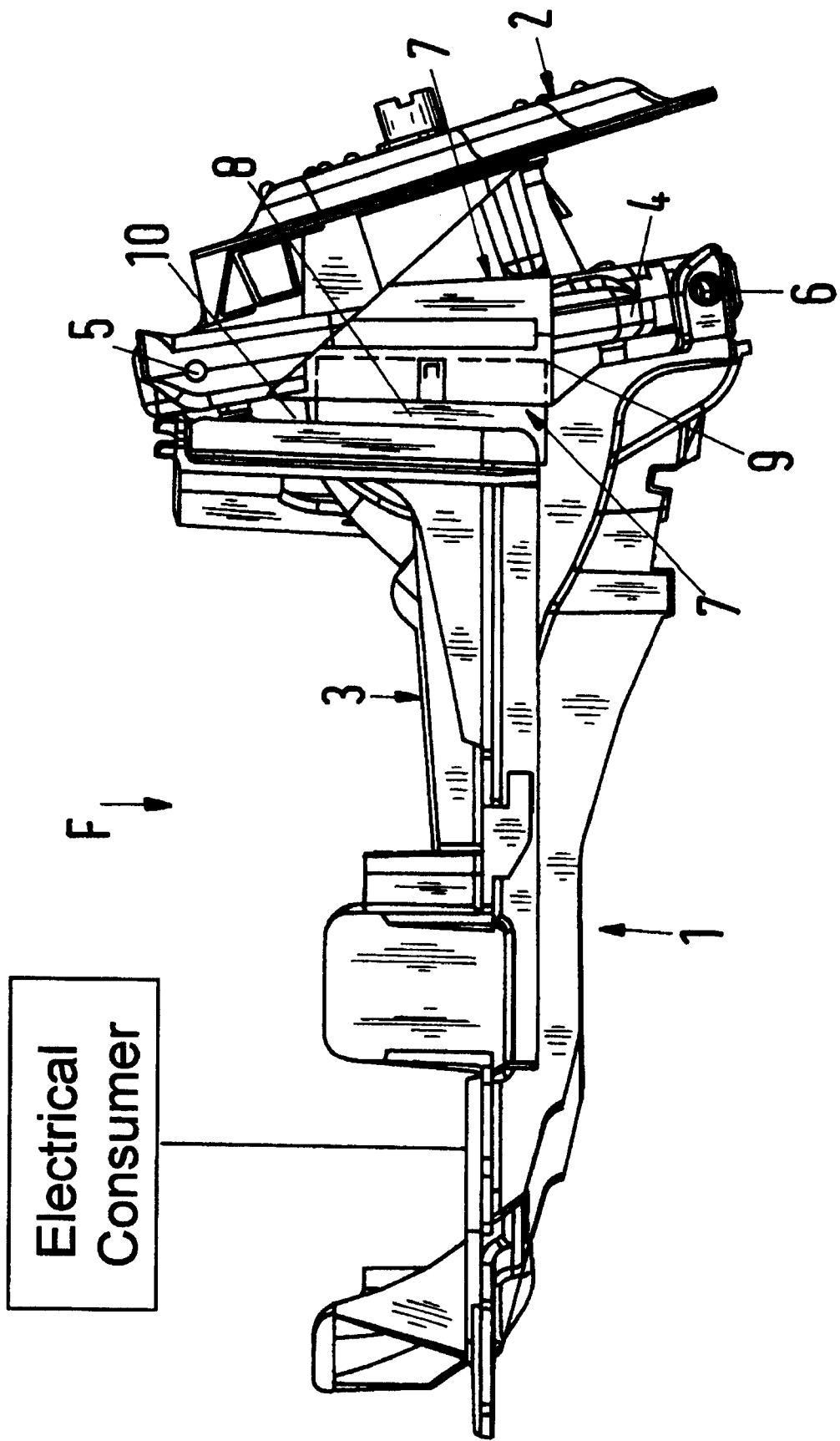
FIG. 1 is a plan view of an exterior rearview mirror according to the invention with a mirror head and a mirror base shown in the position of use of the mirror head.
Figure 2:
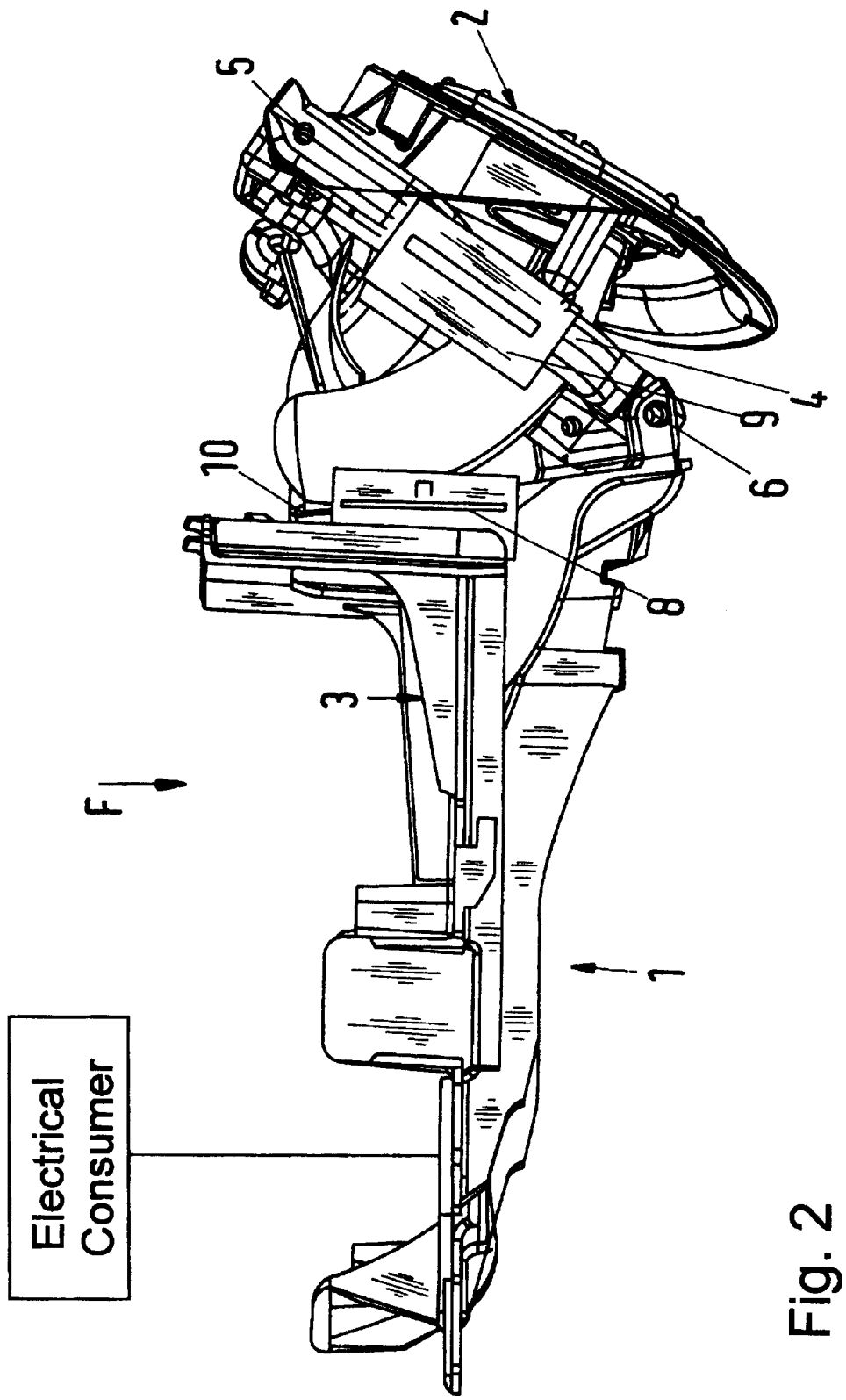
FIG. 2 is an illustration corresponding to FIG. 1 with the mirror head in the folded position.

FIGS. 1 and 2 show an exterior rearview mirror 1 with a mirror base and a mirror head 3 in which a mirror glass (not illustrated) is adjustably arranged. The exterior rearview mirror 1 is connected by means of the mirror base 2 on the motor vehicle (not illustrated). An intermediate joint 4 is pivotably supported on the mirror base 2 and has two. pivots 5 and 6 about which the mirror head 3 can fold into a first folded position, which is the parking position, and into a second folded position when the mirror head 3 is impacted. When the mirror head 3 is pivoted from the position of use illustrate in FIG. 1 counter to the travel direction F to the rear into the folded parking position. the mirror head 3 pivots about the pivot 5 of the intermediate joint 4. The mirror head 3, however, can also be pivoted, when impacted in the travel direction F, to the front into the position illustrated in FIG. 2. When this occurs, the mirror head 3 pivots about the pivot 8 relative to the intermediate joint 4. When performing this pivot movement, the mirror head 3 becomes disengaged from the opposite pivot 5 of the intermediate joint 4 (FIG. 2), as is known in the prior art.

In the mirror head 3 of the exterior review mirror 1 a motor (not illustrated) for adjusting the mirror glass is provided. Moreover, the mirror head 3 may have arranged therein further electrical consumers such as a heating device for the mirror glass, illumination means and the like. In order to supply these consumers with electrical current, electrical lines 11, 12 are guided through the mirror base 2 into the mirror head 3.

In order for the lines 11, 12 to be able to follow the pivot movement of the mirror head 3 and carry out a corresponding movement while not impairing the pivot movement of the mirror head 3, the lines are comprised of two line sections 11 and 12 (FIG. 3), of which one is arranged within the mirror base 2 and the other in the mirror head 3. The two line sections 11 and 12 are connected to one another by a plug connector 7. The plug connector 7 is comprised of two plug parts 8 and 9 of which one plug part (9) is arranged to be pivotable to a limited extent about the intermediate joint 4 and the other (8) is fixedly arranged in the area of the end face 10 of the mirror head 3 facing the mirror base 2. The plug part 9 that is supported pivotably on the intermediate joint 4 is formed as a plug socket or receptacle into which the stationary plug part 8 of the mirror head 3 is inserted when the mirror head 3 is in the position of use according to FIG. 1.

The plug socket 9 has a carrier plate 22 in which the contact pins 13 through 16 are positioned. When the parts 8, 9 of the plug connector 7 are connected, the contact pins engage the receptacles or contact members 17 to 20 within the plug part 8. The contact pin 16 (FIG. 9) has a collar 25 with which it is secured in or on the carrier plate 22. All contact pins 13 through 16 are embodied accordingly and do not project past the mantle 23 of the plug socket 9. The receptacles 17 to 20 are all of identical configuration and have the shape of a U-shaped hair pin (FIG. 9). In the vicinity of the insertion end 27, the two. legs or contact tongues 20', 20" of the U-shaped receptacle 20 are provided with a constriction formed by inwardly oriented deformations that provide V-shaped contact portions 37, 38 which rest with tension against the contact pins 13 to 16 when the plug parts 8, 9 of the plug connector 7 are connected. The receptacles 17 to 20 are secured safely within the plug part 8. Conductors 30–33 and 43–46 are connected to the contact pins 13 to 16 at the end 24 of the plug socket 9 facing away from the plug part 8 and to the receptacles 17 to 20, respectively.

When the mirror head 3 is in its position of use (FIG. 1), the plug parts 8, 9, which are preferably rectangular in cross-section, are inserted into one another (FIG. 7). By means of the electrical connection provided by plug connector 7, the electrical consumers in the mirror head 3 are supplied with the required current. When the mirror head 3 is folded in the travel direction F (FIG. 2), it disengages the pivot 5 of the intermediate joint 4 and pivots about the pivot 6 of the intermediate joint 4. This pivot movement causes the two plug parts 8, 9 to become detached from one another. One plug part 9 is pivoted upon pivoting of the mirror head 3 about a central axis 41 extending parallel to the pivot 6 so that the two plug parts 8, 9 are disconnected reliably from one another upon pivoting of the mirror head 3. The detached or disconnected position of the plug connector 7 with the end 24' of the plug part 9 being spaced from the plug part 8 is illustrated in FIG. 4 in which the pivot axis 41 of the plug part 9 is also indicated, When the mirror head 3 is pivoted back into its position of use, the plug part 8 impacts on the plug part 9 arranged on the intermediate joint 4 (FIG. 5). Since the plug part 9 is pivotable to a limited extent, it is aligned by being pivoted about the axis 41 relative to the plug part 8 when impacted by the plug part 8 (FIG. 5). Accordingly, the two plug parts 8, 9 upon further pivoting of the mirror head 3 back into the position of use are moved toward one another such that the plug connector 7 is rejoined.

When pivoting back the mirror head 3, the plug part 8 will contact with its leading edge 39, In the pivot direction P (FIG. 5), the rim 40 of the plug part 9. Accordingly, this plug part 9 is pivoted about its axis 41 in a counterclockwise direction until it reaches the position illustrated in FIG. 6 in which the contact pins 13 to 16 are aligned with the receptacles 17 to 20. The plug parts 8 and 9 are thus reliably inserted Into one another (insertion direction P' in FIG. 7). In the final position, the plug part 8 rests with its end face 42 facing the plug part 9 against the carrier plate 22.

Since the plug part 9 is pivotable only to a limited extent about the axis 41, it is ensured that the plug part 9 is not pivoted about the axis 41 to such an extent that the two plug parts 8, 9 could no longer be inserted into one another when is pivoting the mirror head 3 back.

While specific embodiments of the invention have been shown and described in detail to illustrate the inventive principles, it will be understood that the invention may be embodied otherwise without departing from such principles.

What is claimed is:
1. An exterior rearview mirror (1) for motor vehicles, the exterior rearview mirror comprising:
   a mirror base (2) and a mirror head (3) connected to the mirror base (2) so as to be foldable relative to the mirror base (2) in at least one direction from a position of use into a folded position;
   at least one electrical line (11, 12) extending through the mirror base (2) to at least one electrical consumer arranged in the mirror head (3);
   the at least one electrical line (11, 12) comprised of at least one first line section (12) arranged in the mirror base (2) and at least one second line section (11) arranged in the mirror head (3);
   a first plug part (9) connected to the at least one first line section (12) and a second plug part (8) connected to the at least one second line section (11);
   wherein the first and second plug parts (8, 9) detachably connect the at least one first line section (12) and the at least one second line section (11) to one another in the position of use of the mirror head (3); and
   wherein the first and second plug parts (8, 9) are configured to detach from one another when the mirror head (3) is folded from the position of use into the folded position and to reconnect automatically when the mirror head (3) is moved from the folded position into the position of use.

2. The exterior rearview mirror according to claim 1, wherein the first plug part (9) is positioned within the mirror base (2) and the second plug part (8) is positioned within an end portion of the mirror head (3) facing the mirror base (2).

3. The exterior rearview mirror according to claim 1, further comprising an intermediate joint (4) connecting the mirror base (2) and the mirror head (3), wherein the first plug part (9) is connected to the intermediate joint (4).

4. The exterior rearview mirror according to claim 1, wherein the first plug part (9) is a plug receptacle and wherein the second plug part (8) is inserted into the receptacle (9) in the position of use of the mirror head (3).

5. The exterior rearview mirror according to claim 1, wherein the second plug part (8) has at least one contact tongue (20', 20").

6. The exterior rearview mirror according to claim 5, wherein the second plug part (8) has several of the at least one contact tongues (20', 20") spaced apart from one another at identical spacing.

7. The exterior rearview mirror according to claim 6, wherein the contact tongues (20', 20") are formed by the legs of a U-shaped contact member (17–20).

8. The exterior rearview mirror according to claim 6, wherein the contact tongues (20', 20") have a free end and a constriction (37, 38) located at a spacing from the free end.

9. The exterior rearview mirror according to claim 8, wherein the constriction (37, 38) is formed by at least one deformation of the contact tongues (20', 20"), respectively.

10. The exterior rearview mirror according to claim 9, wherein the constriction (37, 38) is formed by two of the deformations positioned opposite one another.

11. The exterior rearview mirror according to claim 1, wherein the first plug part (9) has one or several contact pins (13–16).

12. The exterior rearview mirror according to claim 11, wherein the several contact pins (13–16) are arranged adjacent to one another with identical spacing to one another.

13. The exterior rearview mirror according to claim 11, wherein the first plug part (9) has a carrier (22) and wherein the one or several contact pins (13–16) are secured on the carrier (22).

14. The exterior rearview mirror according to claim 13, wherein the carrier is a carrier plate (22).

15. The exterior rearview mirror according to claim 1, wherein at least one of the first and second plug parts (8, 9) is configured to be pivotable.

16. The exterior rearview mirror according to claim 15, further comprising an intermediate joint (4) connecting the mirror base (2) and the mirror head (3), wherein the first plug part (9) is connected to the intermediate joint (4) and has a pivot axis (41) about which the first plug part (9) is pivotable.

17. The exterior rearview mirror according to claim 15, wherein the first plug part (9) is pivotable to a limited extent when the mirror head (3) is folded into the folded position.

18. The exterior rearview mirror according to claim 1, wherein one of the first and second plug parts (8, 9) is a hollow member forming a receptacle.

* * * * *